(12) United States Patent
Sato

(10) Patent No.: US 6,219,106 B1
(45) Date of Patent: Apr. 17, 2001

(54) VIDEO SIGNAL CAPTURING APPARATUS

(75) Inventor: Yuji Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/089,670

(22) Filed: Jun. 3, 1998

(30) Foreign Application Priority Data

Jun. 3, 1997 (JP) .................................................. 9-145418

(51) Int. Cl.[7] .................................................. H04N 5/08
(52) U.S. Cl. .................. 348/525; 348/572; 348/523; 348/552; 348/567; 710/56
(58) Field of Search .................. 348/572, 521, 348/523, 525, 552, 553, 567, 500; 345/520, 521; 710/56, 22; H04N 5/08

(56) References Cited

U.S. PATENT DOCUMENTS

| | | | | |
|---|---|---|---|---|
| 5,915,130 | * | 6/1999 | Kim ...................................... | 345/520 |
| 5,953,074 | * | 9/1999 | Reddy .................................. | 348/558 |
| 5,986,716 | * | 11/1999 | Sokawa et al. ..................... | 348/553 |
| 6,012,109 | * | 1/2000 | Schultz ................................ | 710/56 |
| 6,025,884 | * | 2/2000 | Choi .................................... | 348/567 |
| 6,043,845 | * | 3/2000 | Thompson ........................... | 348/390 |

* cited by examiner

*Primary Examiner*—John Peng
*Assistant Examiner*—Jean W. Désir
(74) *Attorney, Agent, or Firm*—Oliff & Berridge, PLC

(57) ABSTRACT

A video signal capturing apparatus has a converter unit that converts an input video signal into digital video data and a digital video data writing control unit that controls writing of the digital video data converted by the converter unit in a memory. Thereby, digital video data for an external processing apparatus that uses the digital video data stored in the memory is captured. A separator unit separates a horizontal synchronizing signal from the input video signal. Based on the horizontal synchronizing signal thereby separated, a writing instructing unit instructs that the portion of the digital video data corresponding to an image information transmission be written in the memory. Thereby storage of unnecessary data is avoided in contrast with an apparatus that captures all the data including synchronizing signals. Based on the horizontal synchronizing signal, a time interval calculator unit calculates a time interval between start of a present horizontal scan and start of the previous horizontal scan. The writing instructing unit instructs that data regarding the calculated start time interval be written in the memory in combination with the digital video data corresponding to the present horizontal scan. Therefore, a timing shift of a horizontal synchronizing signal that may be caused by the lengthening or shorting of the signal is compensated for.

21 Claims, 3 Drawing Sheets

VIDEO SIGNAL CAPTURING APPARATUS

BACKGROUND OF THE INVENTION

1. Field of Invention

The present invention relates to a video signal capturing apparatus for capturing video data for use by an external processing apparatus by converting input video signals into digital video data and storing the digital video data in a memory so that the digital video data may be used by the external processing apparatus.

2. Description of Related Art

Many systems have been developed in which input video signals are image-processed in a predetermined manner by a personal computer or the like or printed out by a printing mechanism. Such a system employs a video signal capturing apparatus for capturing video signals to be used by an external processing apparatus, for example, a personal computer or a printing mechanism.

Video signals systems such as a NTSC system use a four-field sequence as described below. An NTSC system employs an interlace scanning method in which a frame is formed by two vertical sweeps and 525 horizontal sweeps. Interleaving is performed to reduce the influence of chroma components on luminance components. That is, a frequency of the color subcarrier waves (i.e., the subcarrier wave for the chrominance signals) is selected such that the multiple product of an odd number and the half period of the subcarrier waves equals the horizontal sweep time duration. Therefore, the color subcarrier waves are completely out of the phase, i.e., inverted 180°, for every horizontal scanning line. Since the total number of horizontal lines scanned for a single frame by two fields, is 525, which is an odd number, the phase of the color subcarrier waves is opposite for every frame. More specifically, the polarity of the sine waveform at a given horizontal position on each scanning line alternates for every frame. Since the total number of horizontal lines scanned for two frames by four fields is 1050, which is an even number, the color subcarrier waves and the horizontal lines are in phase every two frames. Thus, taking multiplex chrominance signals into account, the video signals of the NTSC system are in four-field sequences in which a single sequence, including the phase of the color subcarrier waves (frequency fsc=3.58 MHz), is completed by four fields even in the case of a static picture image. The four fields are termed color fields 1 to 4, respectively.

Some conventional video signal capturing apparatuses capture video signals by converting input video signals into digital video data and storing the digital video data in a memory. In a video signal capturing apparatus of this type, video signals which include horizontal synchronizing signals may be captured by analog-to-digital conversion as indicated in FIGS. 3–5. Although the time relationship between the horizontal synchronizing signals and all the data is indicated in the captured digital data, the captured data contain unnecessary data as well because all the data, including data from portions where no image information is carried, are captured.

As a countermeasure, only the digital video data from portions that carry image information may be captured as indicated in FIG. 4. However, this method has problems if a horizontal synchronizing signal is disturbed. For example, when video signals to be captured are provided from a storage medium, e.g., a video tape, optical (magnetic) disk or the like, horizontal synchronizing signals may be lengthened or shortened. Therefore, the horizontal synchronizing signals are shifted from a predetermined timing on the time axis by influence from a drive mechanism that is necessary to drive or turn the storage medium for reproduction. When the horizontal synchronizing signals are thus disturbed, the time intervals between scanning lines become inconsistent resulting in indeterminable time intervals. That is, if data capture is performed with reference to horizontal synchronizing signals, a disturbance in the horizontal synchronizing signals makes the time relationship between video data of sequential horizontal scanning lines indeterminable. With such an indeterminable timing in the captured digital video data, an external processing apparatus cannot properly processes the digital video data.

The aforementioned problem of a timing shift of horizontal synchronizing signals can be solved by separating brightness signals Y and chrominance signals C beforehand by a YC separating method, and capturing the separated signals by converting them separately into digital data. In this case, however, the apparatus structure becomes complicated because a YC separating circuit for separating brightness signals Y and chrominance signals C beforehand and A/D converters for converting the brightness signals Y and the chrominance signals C separately into digital data are required. Furthermore, in a circuit performing separated data capture, it is common practice to employ a YUV data capturing method in which the chrominance signals C are further separated into horizontal frequency components U and vertical frequency components V. If YUV data capturing is employed, circuit structure for the further separation and an arrangement for the A/D conversion of the separated signals become complicated.

SUMMARY OF THE INVENTION

Accordingly, it is an aspect of the present invention to provide a simple structure video signal capturing apparatus for storing, in a memory, digital video data corresponding to periods during which image information is transmitted while omitting horizontal synchronizing signals compensating for a timing shift of the horizontal synchronizing signals.

According to the invention, there is provided a video signal capturing apparatus including a converter unit that converts an input video signal into digital video data and a video data writing control unit that controls writing the converted digital video data in a memory. As a result, video data is captured and stored for use by an external processing apparatus. A separator unit separates a horizontal synchronizing signal from the input video signal. Based on the horizontal synchronizing signal separated by the separator unit, a writing instructing unit optionally instructs that the digital video data substantially corresponding exclusively to a period when image information is transmitted be written in the memory. Based on the horizontal synchronizing signal, a time interval calculator unit calculates a start time interval between start of a present horizontal scan and start of a previous horizontal scan. The writing instructing unit optionally instructs that data regarding the start time interval calculated by the time interval calculator unit be written in the memory in combination with the digital video data corresponding to a present horizontal scan.

In the video signal capturing apparatus of the invention, the converter unit converts the input video signal into digital video data and the video data writing control unit controls the writing of the converted digital video data in the memory. By writing digital video data in the memory using the video data writing control unit, the capturing apparatus captures and stores, in a memory, video data for use by an external processing apparatus, such as a personal computer.

In addition to the basic operation described above, the separator unit separates a horizontal synchronizing signal from the input video signal. Additionally, the writing instructing unit optionally instructs that the digital video data substantially corresponding exclusively to a period when image information is transmitted be written in the memory based on the horizontal synchronizing signal separated by the separator unit. Based on the horizontal synchronizing signal, the time interval calculator unit calculates a start time interval between start of a present horizontal scan and start of the previous horizontal scan. Then, the writing instructing unit instructs that data regarding the start time interval calculated by the time interval calculator unit be written in the memory in combination with the digital video data corresponding to the present horizontal scan.

By this operation, the memory stores the digital video data substantially corresponding exclusively to the periods when image information is transmitted and also stores the start time interval between the start of a present horizontal scan and the start of the previous horizontal scan in combination with the digital video data corresponding to the present horizontal scan. Therefore, only the digital video data substantially corresponding exclusively to the periods when image information is transmitted is input to the image memory, as indicated in FIG. 5.

In comparison with the conventional art wherein all the input video signals, including horizontal synchronizing signals, are written in a memory as indicated in FIG. 3, the apparatus of the invention substantially avoids storage of unnecessary data in the memory. Moreover, the digital video data corresponding to each horizontal scan is stored during the time interval between the start of the horizontal scan and the start of the previous horizontal scan. Therefore, even if a horizontal synchronizing signal is lengthened or shortened and therefore shifted on the time axis, the time interval between horizontal scans can be determined. Therefore, such a time shift can be compensated for. Consequently, the digital video data stored in the memory can be used by an external processing apparatus without any significant problem.

As discussed above, the problems caused by a timing shift of the horizontal synchronizing signal can be solved by separating brightness signals Y and chrominance signals C using the YC separation method beforehand and separately converting the respective signals into digital data so that only the portions that carry image information can be captured. However, this method requires a complicated apparatus structure. In contrast, according to the invention, the problems of a horizontal synchronizing signal timing shift can be solved by adding a structure which calculates a time interval between the start of a present horizontal scan and the start of the previous horizontal scan and stores data regarding the time interval in combination with the digital video data corresponding to the present horizontal scan. Thus, the invention solves the aforementioned timing shift problems using a simple structure.

To write in a memory the data regarding the time interval between the start of a present horizontal scan and the start of the previous horizontal scan in combination with the digital video data corresponding to the present horizontal scan, the writing instructing unit optionally instructs that the data regarding the start time interval be added to a head of the digital video data corresponding to the present horizontal scan.

The digital video data writing in the memory may be performed using a CPU. Alternatively, the digital video data writing in the memory may be performed by a direct memory access (DMA). Since a CPU needs to have high-speed operating performance in order to control the digital video data writing in the memory, employment of a DMA may be more practical.

The video signal capturing apparatus may also have a structure including a separator unit capable of separating a vertical synchronizing signal, a timing determining unit that determines a field start timing based on the vertical synchronizing signal separated by the separator unit and a writing instructing unit capable of instructing that the digital video data be written in the memory separately for fields based on determination by the timing determining unit.

Furthermore, the video signal capturing apparatus may include a FIFO buffer memory to ensure complete capture of the desired digital video data.

BRIEF DESCRIPTION OF THE DRAWINGS

A preferred embodiment of the present invention will be described in detail with reference to the following figures wherein.

DETAILED DESCRIPTION OF PREFERRED EMBODIMENTS

A preferred embodiment of the present invention will be described in detail hereinafter with reference to the accompanying drawings.

Figure 1:
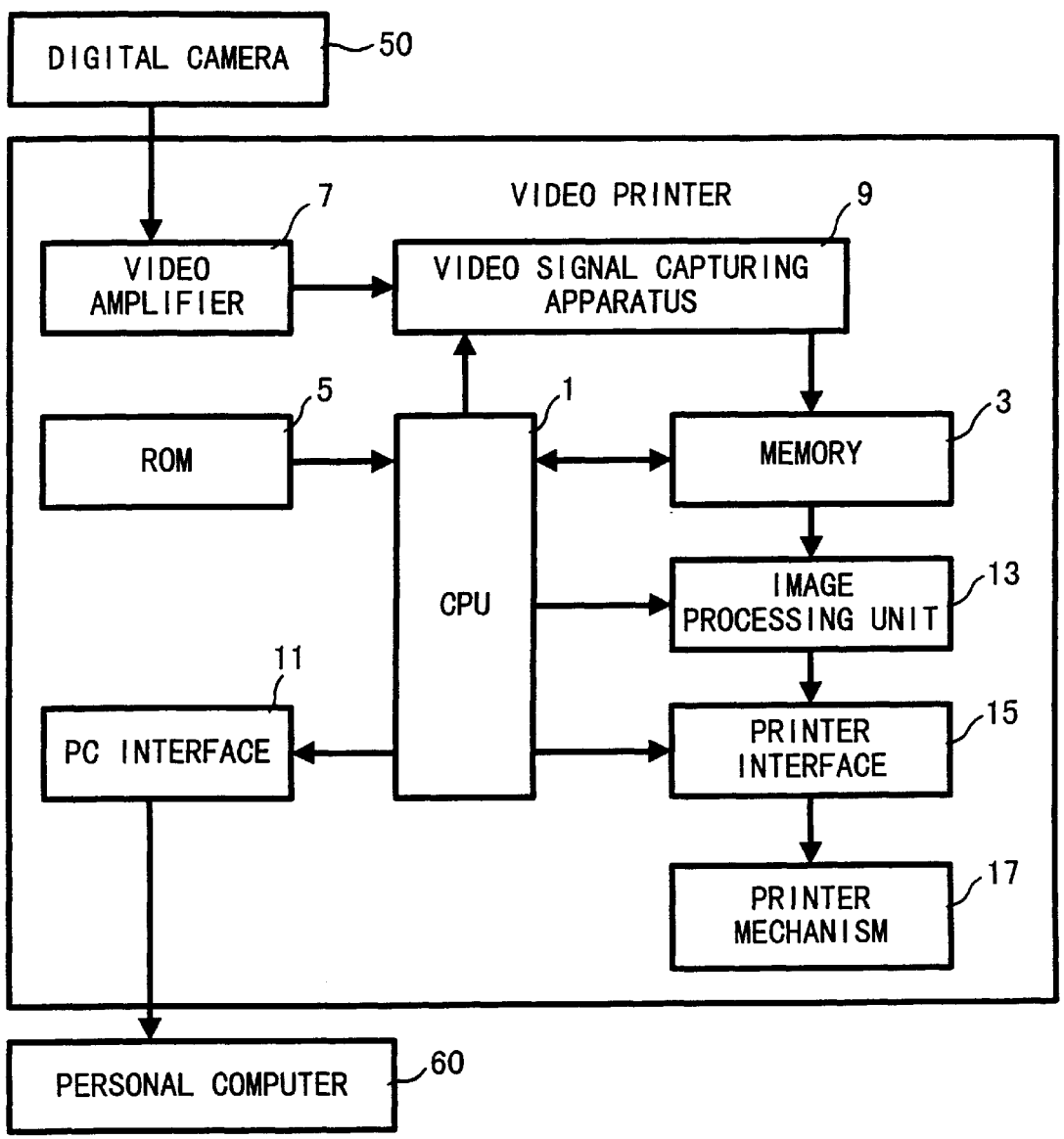
FIG. 1 is a schematic block diagram of a video printer that employs a video signal capturing apparatus according to a preferred embodiment of the invention.

FIG. 1 is a schematic block diagram of a video printer employing a video signal capturing apparatus according to an embodiment of the invention.

The video printer includes a CPU 1 for controlling the entire system of the video printer, a memory 3, a ROM 5 storing operation programs for the CPU 1 and the like, a video amplifier 7, a video signal capturing apparatus 9, a data processing apparatus such as a personal computer (PC) interface 11, an image processing unit 13, a printer interface 15, and a printer mechanism 17.

The memory 3 in this embodiment is preferably formed by a DRAM, and used to, for example, temporarily store the digital video data captured by the video signal capturing apparatus 9.

The video amplifier 7 amplifies input video signals, for example, color video signals input from an externally-provided camera 50 and then outputs the amplified signals to the video signal capturing apparatus 9. The camera 50 may be a digital camera as illustrated in FIG. 1. Conventional digital cameras typically include a digital output and an analog output both outputting the same information but in digital and analog for respectively. The preferred embodiment of the invention is explained using an example processing an analog video signal. The video signal capturing apparatus 9 converts the analog color video signals from the video amplifier 7 into digital signals, selectively captures only desired signal portions of the input video signals and writes the captured signals in the memory 3. The internal construction of the video signal capturing apparatus 9 will be described in detail below.

The PC interface 11 is an interface that is connected to the CPU 1 for data exchange with an externally-provided personal computer 60. The video signals captured by the video signal capturing apparatus 9 and stored in the memory 3 can be transferred to the personal computer 60 via the PC interface 11.

The video signals captured by the video signal capturing apparatus 9 and stored in the memory 3 can be image-processed by the image processing unit 13 and then transferred to the printer mechanism 17 via the printer interface 15 for print processing. The printer mechanism 17 has a print device of an ink jet type, a thermal transfer type or the like, for example, and thereby records, on a recording sheet, the image data and the like received from the image processing unit 13 via the printer interface 15.

In the case of the transfer of video signals to the printer mechanism 17, the video signals stored in the memory 3 are subjected to processing, e.g., YC separation, and then transferred to a local memory (not shown) provided in the image processing unit 13. Then, the image processing unit 13 performs image processing, e.g., image area separation, outline enhancement (high area enhancement), color correction, black generation, γ-correction, error diffusion and the like on the color digital image signals stored in the local memory. The image-processed color digital image signals are transferred to the printer mechanism 17 via the printer interface 15.

Figure 2:
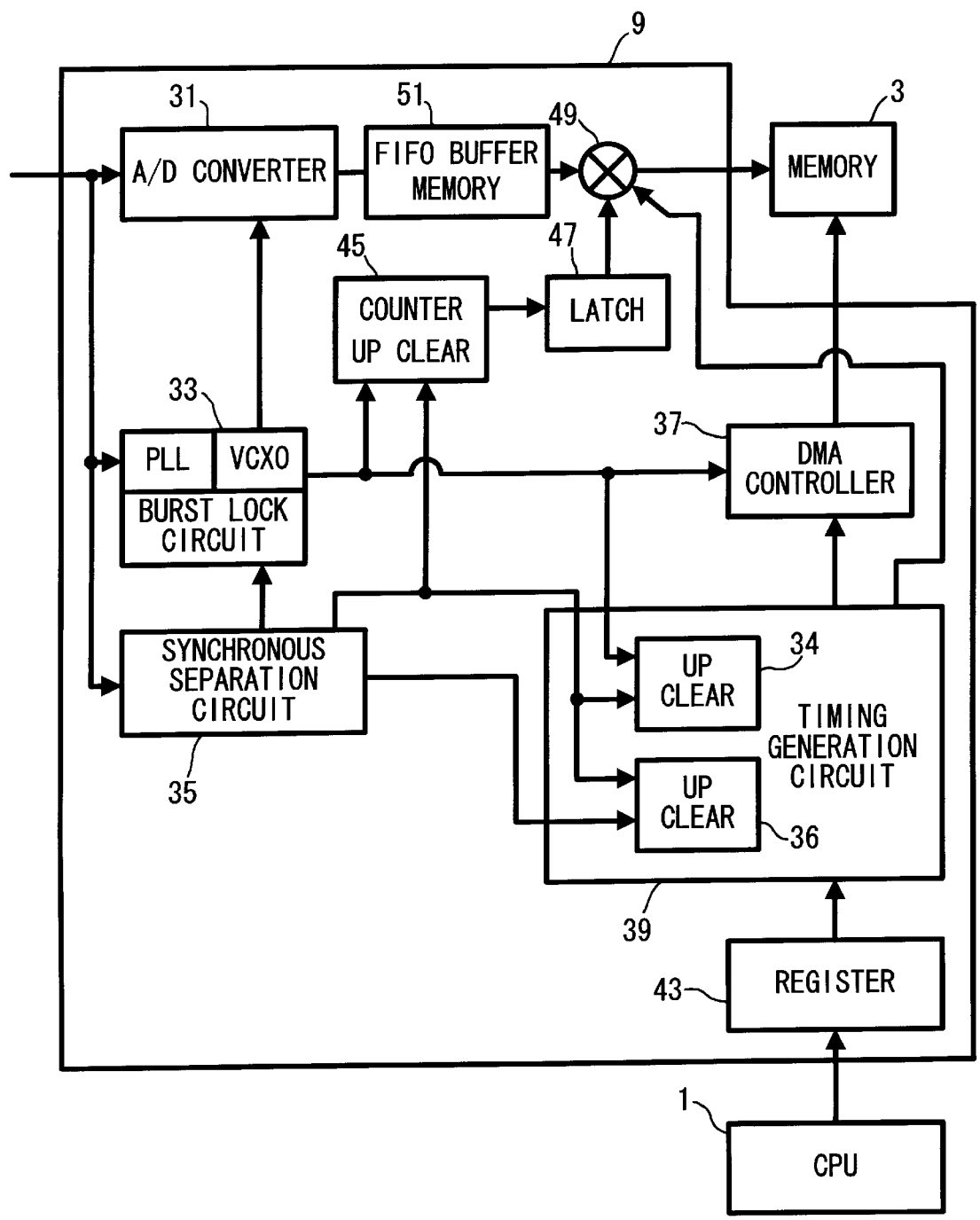
FIG. 2 is a circuit block diagram of the video signal capturing apparatus according to the embodiment.
Figure 3:
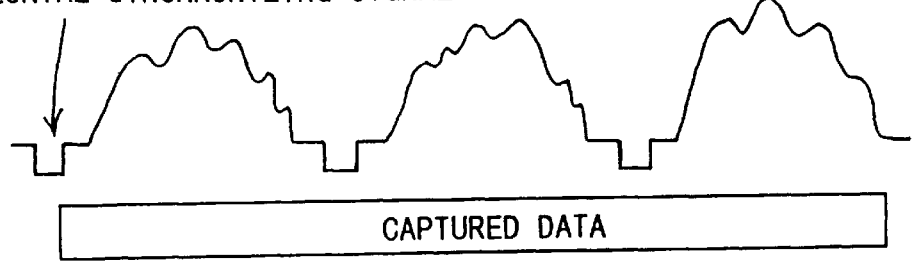
FIG. 3 illustrates a conventional video signal capturing scheme in which all the video signals are captured.
Figure 4:
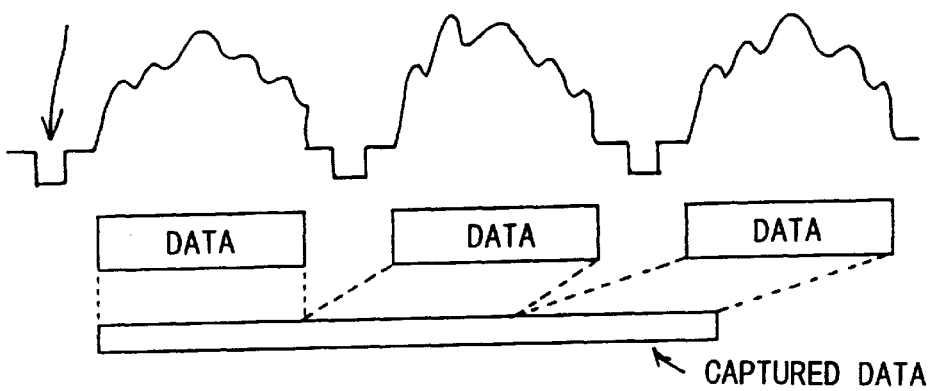
FIG. 4 illustrates a conventional video signal capturing scheme in which only the portions of the video signals carrying image information are captured.

The general structure of the video printer employing the video signal capturing apparatus 9 should be understood from the foregoing brief description. The structure of the video signal capturing apparatus 9 will now be described with reference to the circuit diagram of FIG. 2.

The video signal capturing apparatus 9 includes an A/D converter 31 (a converter unit), a burst lock circuit 33, a synchronous separation circuit 35 (a separator unit), a direct memory access (DMA) controller 37, a timing generation circuit 39, a register 43, a counter 45, a latch 47 and an output switching unit 49. The burst lock circuit 33 and the DMA controller 37 comprise a video data writing control unit. The timing generation circuit 39 and the register 43 comprise a writing instructing unit. The timing generation circuit 39 also serves as a determining unit. The counter 45 and the latch 47 comprise a time interval calculator unit.

The analog color video signals from the video amplifier 7 shown in FIG. 1 are input to the A/D converter 31, the burst lock circuit 33 and the synchronous separation circuit 35.

The A/D converter 31 converts the input analog color video signals into digital video data and outputs the data to the memory 3. More specifically, the output switching unit 49 is connected between the A/D converter 31 and the memory 3. If the output switching unit 49 has been switched to the A/D converter 31, the digital video data A/D-converted by the A/D converter 31 are output to the memory 3.

The digital video data from the A/D converter 31 are written in the memory 3 if a writing instruction is output from the DMA controller 37 to the memory 3. The digital video data thus-written in the memory 3 can be transferred to the external personal computer 60 via the PC interface 11. Thus, the video signal capturing apparatus 9 captures the video data for the personal computer 60.

Figure 5:
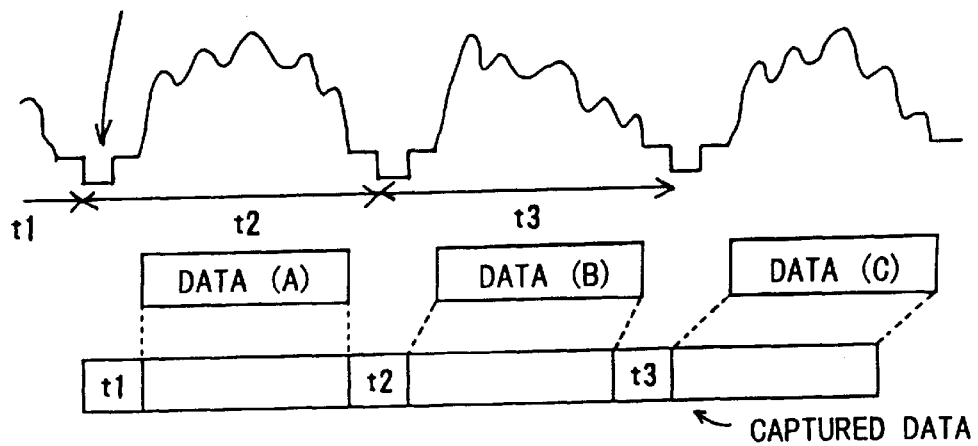
FIG. 5 illustrates a video signal capturing scheme according to the invention.

The video data capture in this embodiment is performed in a sophisticated manner because the embodiment is intended for use to input analog video signals of the NTSC system. Analog video signals of the NTSC system are formed as composite signals that contain signals indicating image information, horizontal synchronizing signals, vertical synchronizing signals and the like. Therefore, if all the input analog video signals are captured, data other than image information data are also written in the memory 3. Therefore, a portion of the memory 3 is used to store unnecessary data. To avoid this, the video signal capturing apparatus 9 of this embodiment is designed so that data input to the memory 3 from the A/D converter 31 will not actually be written in the memory 3 if the writing instruction is not output by the DMA controller 37. Therefore, in the embodiment, only the data from portions of signal carrying image information are actually written in the memory 3 as indicated in FIG. 5.

The structure for writing in the memory 3 only the data from portions that actually carry image information will be further described.

The aforementioned synchronous separation circuit 35 separates the horizontal synchronizing signals and the vertical synchronizing signals from the input video signals. The horizontal synchronizing signals and the vertical synchronizing signals are outputted from the synchronous separation circuit 35 to the timing generation circuit 39. The horizontal synchronizing signals are also outputted to the counter 45. The burst gate signals that occur at a predetermined time following the horizontal synchronizing signals are output from the synchronous separation circuit 35 to the burst lock circuit 33.

In the burst lock circuit 33, a VCXO portion oscillates at four times the frequency of the burst signals (3.58 MHz×4) and outputs clock signals to the A/D converter 31 and the DMA controller 37. The clock signals are also output to the counter 45 and the timing generation circuit 39.

The timing generation circuit 39 has two different internal counters 34 and 36. A first counter 34 is counted up by the clock signals from the burst lock circuit 33 and cleared to zero by the horizontal synchronizing signals. The second counter is counted up by the horizontal synchronizing signals and cleared by vertical synchronizing signals.

The timing generation circuit 39 also receives values set in the register 43 by the CPU 1. In this embodiment, the timing generation circuit 39 determines the timing at which effective ranges of data, i.e., the data from only the portions of the signal that carry image information, are written in the memory 3, based on the two counters 34 and 36 of the timing generation circuit 39 and the values set in the register 43. Since a vertical synchronizing signal leads each field, the vertical synchronizing signals provide a basis for determining the number of fields. Further, since a horizontal synchronizing signal occurs for every horizontal scanning unit, the horizontal synchronizing signals provide a basis for determining the start of each signal portion carrying image information, which follows the corresponding horizontal synchronizing signal. The end of the signal portion carrying image information in each horizontal scanning unit can be determined by counting up from the start of the signal portion based on the clock signals. More specifically, when the counted-up value becomes equal to the value set in the register 43, the timing generation circuit 39 outputs a start trigger to the DMA controller 37 so as to cause the DMA controller 37 to output the writing instruction to the memory 3.

The timing generation circuit 39 outputs a switching instruction to the output switching unit 49. As described above, the output switching unit 49 is connected between the A/D converter 31 and the memory 3. If the output switching unit 49 has been switched to output to the A/D converter 31, the digital video data obtained through the A/D conversion by the A/D converter 31 are output to the memory 3. The data from the latch 47 are also input to the switching unit 49. If the output switching unit 49 has been switched to output to the latch 47, the count value of the counter 45 is output to the memory 3 via the latch 47 and the output switching unit 49. The counter 45 is counted up by the clock signals from the burst lock circuit 33 and cleared to zero by the horizontal synchronizing signals. The count value from the latch 47 is written in the memory 3 if the writing instruction is output from the DMA controller 37 to the memory 3.

Therefore, in the video signal capturing apparatus 9 according to this embodiment, when the horizontal synchronizing signals separated from the video signals are input to the timing generation circuit 39, the timing generation circuit 39 outputs to the output switching unit 49 the switching instruction to switch the output to the latch 47 and also outputs the start trigger to the DMA controller 37. Then, the value counted up by the counter 45 is output from the latch 47 to the memory 3 via the output switching unit 49 and the count value is written in the memory 3 based on the writing instruction from the DMA controller 37. Since the count value is a value counted up on the basis of the clock signals after the counter 45 has been cleared by the input of the horizontal synchronizing signal corresponding to the previous horizontal scan, the count value indicates the time interval between the start time of the previous horizontal scan and the start time of the present horizontal scan.

After that, the timing generation circuit 39 outputs to the output switching unit 49 the switching instruction to switch the output to the A/D converter 31. Then, data are output from the A/D converter 31 to the memory 3. However, the DMA controller 37 does not output the writing instruction to the memory 3 at this moment so the data from the A/D converter 31 are not written in the memory 3.

When the first internal counter 34 of the timing generation circuit 39 is cleared by the horizontal synchronizing signals, counted up by the clock signals and presents a value equal to the value set for capture start in the register 43, the timing generation circuit 39 outputs a trigger to the DMA controller 37. The DMA controller 37 thereby outputs the writing instruction to the memory 3. Subsequently, the data from the A/D converter 31 are written in the memory 3.

Next, when the internal counter of the timing generation circuit 39 cleared by the horizontal synchronizing signals and counted up by the clock signals is a value equal to a value for capture end set in the register 43, the timing generation circuit 39 outputs a trigger to the DMA controller 37. Thereby, the DMA controller 37 stops outputting the writing instruction to the memory 3. Subsequently on, the data from the A/D converter 31 are prevented from being written in the memory 3.

Through this operation, the memory 3 stores only the selected data from the digital video data outputted from the A/D converter 31. That is, the memory 3 stores the digital video data corresponding only to periods during which image information is transmitted and the time interval between the start of the previous horizontal scan and the start of the present horizontal scan in the form of the corresponding number of clock signals. The corresponding number of clock signals is attached to the digital video data corresponding to the present horizontal scan.

Therefore, the memory 3 stores substantially only necessary data for reliable processing by an external apparatus. This storage is in contrast with a conventional video signal capturing apparatus in which all the input video signals are converted into digital video data and the digital video data, including horizontal synchronizing signals, are written in a memory.

Moreover, in the present invention the digital video data corresponding to each horizontal scan is stored during the time interval between the start of the horizontal scan and the start of the previous horizontal scan, as indicated by t1, t2, t3 in FIG. 5. Therefore, even if a horizontal synchronizing signal is lengthened or shortened and, therefore, shifted on the time axis, the time interval between horizontal scans can be determined. Therefore, such a time shift can be appropriately compensated for. Consequently, the digital video data stored in the memory 3 can be used by the external personal computer 60 without any significant problem.

In the embodiment, since one of the two internal counters 34 and 36 of the timing generation circuit 39 is cleared to zero by the vertical synchronizing signals and counted up by the horizontal synchronizing signals, it is possible to identify the placement of the digital video data of each horizontal scanning unit in a sequence of a horizontal scanning units. Therefore, such identification data may be added to the digital video data written in the memory 3. Furthermore, field identification data detected based on the vertical synchronizing signals separated by the synchronous separation circuit 35 may be added to the digital video data written in the memory 3.

Alternatively, the data from the A/D converter 31 is input to the memory 3 via the output switching unit 49 and a FIFO buffer memory 51 is connected between the A/D converter 31 and the output switching unit 49 and controlled by the DMA controller 37. This ensures that only the data corresponding to the periods during which image information is transmitted is input to the memory 3 rather than the total digital video data outputted from the A/D converter 31.

When the internal counter of the timing generation circuit 39 is cleared by horizontal synchronizing signals, counted up by clock signals and reaches the value for capture start set in the register 43, the timing generation circuit 39 outputs a trigger to the DMA controller 37 so that the DMA controller 37 outputs the writing instruction to the memory 3. However, with this timing generation for the writing instruction, the digital video data to be captured may not be entirely captured, depending on performance characteristics of each circuit block. Such potential mis-capture can be prevented by providing the aforementioned FIFO buffer memory 51 for the digital video data output from the A/D converter 31.

Although the foregoing embodiment is described in conjunction with the video printer, the application of the invention is not limited to video printers. The invention may be applied in substantially the same manner to any system that captures video signals and performs data-processing on the signals.

It is to be understood that the invention is not restricted to the particular forms shown in the foregoing embodiments. Various modifications and alternations can be made thereto without departing from the scope of the invention.

What is claimed is:

1. A video signal capturing apparatus for capturing an input video signal comprising:
   a memory that stores digital video data;
   a digital video data writing control unit that controls writing of the digital video data in the memory so that the digital video data is captured and stored in the memory for use by a processing apparatus;

a separator unit that separates a horizontal synchronizing signal from the input video signal;

a writing instructing unit that, based on the horizontal synchronizing signal separated by the separator unit, instructs the digital video data writing control unit to write a portion of the digital video data in the memory, said portion substantially corresponding to an image information transmission period of the input video signal; and a time interval calculator unit that calculates a start time interval between start of a present horizontal scan and start of a previous horizontal scan based on the horizontal synchronizing signal, wherein the writing instructing unit instructs that data regarding the start time interval calculated by the time interval calculator unit be written in the memory in combination with the digital video data corresponding to the present horizontal scan.

2. A video signal capturing apparatus according to claim 1, further comprising:

a converter unit that converts the input video signal into the digital video data.

3. A video signal capturing apparatus according to claim 2, wherein the separator unit separates a vertical synchronizing signal from the input video signal; and the video signal capturing apparatus further comprises a time determining unit that determines a field start time based on the vertical synchronizing signal separated by the separator unit, wherein the writing instructing unit instructs that the digital video data be written in the memory separately for fields based on a determination by the time determining unit.

4. A video signal capturing apparatus according to claim 2, wherein the separator unit separates a vertical synchronizing signal; and the video signal capturing apparatus further comprises a time determining unit that determines a field start time based on the vertical synchronizing signal separated by the separator unit;

wherein the writing instructing unit instructs that the digital video data be written in the memory separately for fields based on a determination by the time determining unit.

5. A video signal capturing apparatus according to claim 1, wherein the writing of the digital video data in the memory is performed using a direct memory access.

6. A video signal capturing apparatus according to claim 1, wherein the writing instructing unit instructs that the data regarding the start time interval calculated by the time interval calculator unit be added to a head of the digital video data corresponding to the present horizontal scan.

7. A video signal capturing apparatus according to claim 6, wherein the separator unit separates a vertical synchronizing signal;

the video signal capturing apparatus further comprises a time determining unit that determines a field start time based on the vertical synchronizing signal separated by the separator unit; and the writing instructing unit instructs that the digital video data be written in the memory separately for fields based on a determination by the time determining unit.

8. A video signal capturing apparatus according to claim 6, wherein the writing of the digital video data in the memory is performed using direct memory access.

9. A video signal capturing apparatus according to claim 8, wherein the separator unit separates a vertical synchronizing signal;

the video signal capturing apparatus further comprises a time determining unit that determines a field start time based on the vertical synchronizing signal separated by the separator unit; and the writing instructing unit instructs that the digital video data be written in the memory separately for fields based on a determination by the time determining unit.

10. A method for capturing an input video signal for use by a processing apparatus, said method comprising:

writing digital video data in a memory using a digital video data writing control unit;

controlling the writing of the digital video data in the memory so that the digital video data is captured and stored in the memory for use by the processing apparatus;

separating a horizontal synchronizing signal from the input video signal;

instructing writing of a portion of the digital video data in the memory based on the separated horizontal synchronizing signal, said portion substantially corresponding to an image information transmission period of the input video signal; and calculating a start time interval between start of a present horizontal scan and start of a previous horizontal scan based on the horizontal synchronizing signal, wherein the instructing writing step instructs that data regarding the calculated start time interval be written in the memory in combination with the digital video data corresponding to the present horizontal scan.

11. A method for capturing video signals according to claim 10, further comprising:

inputting the input video signal; and converting the input video signal into digital video data.

12. A method for capturing video signals according to claim 10, wherein the separating step separates a vertical synchronizing signal;

the method further comprises determining a field start time based on the separated vertical synchronizing signal; and the instructing step instructs that the digital video data be written in the memory separately for fields based on the determined field start time.

13. A method for capturing video signals according to claim 11, wherein the separating step separates a vertical synchronizing signal;

the method further comprises determining a field start time based on the separated vertical synchronizing signal; and the instructing step instructs that the digital video data be written in the memory separately for fields based on the determined field start time.

14. A method for capturing video signals according to claim 10, wherein the writing of the digital video data in the memory is performed using a direct memory access.

15. A method for capturing video signals according to claim 10, wherein the instructing step instructs that the data regarding the calculated start time interval be added to a head of the digital video data corresponding to the present horizontal scan.

16. A method for capturing video signals according to claim 15, wherein the separating step separates a vertical synchronizing signal;

the method farther comprises determining a field start time based on the separated vertical synchronizing signal; and the instructing step instructs that the digital video data be written in the memory separately for fields based on the determined field start time.

17. A method of capturing video signals according to claim 15, wherein the writing of digital video data in the memory is performed using a direct memory access.

18. A method of capturing video signals according to claim 17, wherein the separating step separates a vertical synchronizing signal;

the method further comprises determining a field start time based on the separated vertical synchronizing signal; and the instructing step instructs that the digital video data be written in the memory separately for fields based on the determined field start time.

19. A video signal capturing apparatus for capturing an input video signal for use with a processing unit, said apparatus comprising:

means for writing digital video data in a memory;

means for controlling the writing of the digital video data in the memory so that the digital video data is captured and stored in the memory for use by the processing apparatus;

means for separating a horizontal synchronizing signal from the input video signal;

means for instructing the means for writing digital video data to write a portion of the digital video data in the memory based on the separated horizontal synchronizing signal, said portion substantially corresponding to an image information transmission period of the input video signal; and means for calculating a start time interval between start of a present horizontal scan and start of a previous horizontal scan based on the horizontal synchronizing signal, wherein the means for instructing writing instructs that data regarding the calculated start time interval be written in the memory in combination with the digital video data corresponding to the present horizontal scan.

20. A video signal capturing apparatus according to claim 19, further comprising:

means for inputting the input video signal; and means for converting the input video signal into digital video data.

21. A video signal capturing apparatus according to claim 19, wherein the means for separating also separates a vertical synchronizing signal from the digital video signal;

the apparatus further comprises means for determining a field start time based on the separated vertical synchronizing signal; and the means for instructing instructs that the digital video data be written in the memory separately for fields based on the determined field start time.

* * * * *